United States Patent [19]

Goebel

[11] 4,309,819
[45] Jan. 12, 1982

[54] METHOD FOR ASSEMBLING AN ELECTROCHEMICAL CELL

[75] Inventor: Franz Goebel, Sudbury, Mass.

[73] Assignee: GTE Products Corporation, Stamford, Conn.

[21] Appl. No.: 159,268

[22] Filed: Jun. 13, 1980

[51] Int. Cl.³ .................. H01M 4/08; H01M 6/00
[52] U.S. Cl. .................. 29/623.1; 29/507; 29/523; 429/128
[58] Field of Search .......... 29/623.5, 623.1, 507, 29/506, 523; 429/128, 167, 168, 169, 196, 218

[56] References Cited

U.S. PATENT DOCUMENTS

| | | | |
|---|---|---|---|
| 226,741 | 4/1880 | Graham | 29/523 |
| 701253 | 5/1902 | Bennett | 429/180 |
| 2,379,374 | 6/1945 | Payne | 429/128 |
| 2,656,808 | 10/1953 | Plumeri et al. | 29/523 |
| 2,693,026 | 11/1954 | Simpelaar | 29/506 |
| 3,059,041 | 10/1962 | Vogt | 429/128 |
| 3,116,172 | 12/1963 | Wilke et al. | 429/128 |
| 3,219,487 | 11/1965 | Krouse et al. | 429/169 |
| 3,510,358 | 5/1970 | Nabiullin et al. | 429/169 |
| 3,538,792 | 11/1970 | Stillwagon, Jr. | 29/507 |
| 3,796,606 | 3/1974 | Lehmann et al. | 429/168 |
| 4,060,668 | 11/1977 | Goebel | 429/218 |
| 4,148,974 | 4/1979 | Eppley | 429/194 |

FOREIGN PATENT DOCUMENTS 392345  3/1924  Fed. Rep. of Germany ..... 29/157.3 A

*Primary Examiner*—Daniel C. Crane
*Attorney, Agent, or Firm*—Peter Xiarhos

[57] ABSTRACT

A method for assembling a primary electrochemical cell. The method in accordance with the invention includes the initial step of arranging a plurality of cell components, each having an opening extending therethrough, relative to an elongated, slotted, expandable metal tube so that the tube is loosely disposed within and along the openings in the cell components and the cell components loosely surround the tube in a stacked array. The cell components employed in this step include a plurality of anode structures each having a plurality of resilient, deflective portions facing in the direction of the terminal member and lying within a flat, common plane. Each of the deflective portions further has a contact edge facing in the direction of the terminal member. An expanding member in the form of a solid metal rod is inserted into and progressively advanced along the expandable tube. The expanding member causes the tube to progressively and permanently expand outwardly by an amount to make direct physical contact with the contact edges of the deflective portions of the multiple anode structures, in succession, deflect the deflective portions of each anode structure, and thereafter maintain direct physical contact with the contact edges of such anode structure. By virtue of the above expansion operation, the anode structures are secured to the expanded metal tube.

23 Claims, 6 Drawing Figures

METHOD FOR ASSEMBLING AN ELECTROCHEMICAL CELL

CROSS-REFERENCE TO RELATED APPLICATIONS

In co-pending application Ser. No. 159,271, now U.S. Pat. No. 4,284,691, filed concurrently herewith in the names of Franz Goebel and William T. McHugh, and entitled "ELECTROCHEMICAL CELL", there is disclosed and claimed an electrochemical cell similar to an electrochemical cell as assembled in accordance with the method of the present invention.

In co-pending application Ser. No. 159,266, filed concurrently herewith in the names of John E. Barnes, Franz Goebel and William T. McHugh, and entitled "INTEGRATED CARBON/INSULATOR STRUCTURE AND METHOD FOR FABRICATING SAME", there is disclosed and claimed in integrated carbon/insulator structure as may be used in the electrochemical cell as assembled in accordance with the method of the present invention.

In co-pending application Ser. No. 159,269, now U.S. Pat. No. 4,283,470, filed concurrently herewith in the names of Franz Goebel and Roger K. Freeman, and entitled "ANODE STRUCTURE FOR AN ELECTROCHEMICAL CELLS", there is disclosed and claimed an anode structure as employed in the electrochemical cell as assembled in accordance with the method of the present invention.

BACKGROUND OF THE INVENTION

The present invention relates to a method for assembling an electrochemical cell and, more particularly, to a method for assembling a primary electrochemical cell of a cylindrical design and including a stacked array of cell components.

Primary electrochemical cells are utilized for a wide variety of applications and are commonly available in a large assortment of sizes and shapes. One well known type of primary electrochemical cell is a so-called cylindrical cell. A particularly suitable design for such a cell, especially for high rate (greater than 1 mA/cm$^2$) and low-temperature (to $-40°$ C.) applications, is described in the aforementioned co-pending application Ser. No. 159,271. The cell described in the co-pending application includes a battery stack disposed within a metal housing of the cell together with an electrolytic solution. The battery stack comprises a large number of thin, generally circular, annular-shaped components. These components are superimposed on each other in a vertical stacked array relative to the housing and relative to a central, elongated, cylindrical, metal terminal member which extends completely through the battery stack and is encircled by the battery stack components.

The components of the battery stack include a plurality of anode structures and a plurality of carbon current collector electrode/separator assemblies arranged in the array in alternation with the anode structures. The elongated metal terminal member may be a solid rod or, in the case of a cell of large physical size, a perforated hollow tube for increasing exposure of the stack to electrolytic solution. Each of the anode structures includes a thin metal disc, for example, of lithium, and a contact member adjacent to a central opening in the disc. The contact member has a central opening aligned with the opening in the disc and a plurality of resilient portions defined by said central opening by which the anode structure can be forced onto the end of, and along, the central terminal member to its required position in the stack. When in position, the resilient portions of the contact member grip onto the central terminal member to make direct physical and electrical contact therewith. Each of the carbon current collector electrode/separator assemblies as employed in the abovedescribed cell includes a pair of thin carbon/fiberglass cathode structures physically adjacent to opposite sides of a thin metal (e.g., nickel) current collector disc. These latter components have central openings of a size to space, or electrically isolate, the components from the central terminal member. The current collector disc is of a size and configuration so as to make direct physical and electrical contact with the interior wall of the housing of the cell.

The electrochemical cell as described hereinabove may be assembled by first assembling the entire battery stack relative to the central terminal member outside of the housing and then placing the entire battery stack into the housing or, alternatively, by assembling the components of the battery stack one by one relative to the central terminal member within the housing of the cell. While either assembly method produces generally satisfactory results, it is possible as the battery stack is built up for one or more of the cell components, especially the anode structures which are secured to the central terminal member at the centers thereof, to flare up at the outer edges. This flaring up of the outer edges of the anode structures is due to the fact that the anode structures themselves are very thin and lightweight, as are the other components on opposite sides of the anode structures, as a result of which insufficient compressive forces exist at the outer edges of the anode structures to keep them in a flat position. This flaring up of the outer edges of the anode structures tends to increase in a direction from the bottom of the stack to the top of the stack. As a result, the overall battery stack may be less flat and compact than required, and undesirable gaps or spaces may exist between various ones of the components, leading to the possibility of breakage of one or more of these components.

BRIEF SUMMARY OF THE INVENTION

In accordance with the present invention, a method is provided for assembling an electrochemical cell which offers advantages over the assembly methods as described hereinabove. The method in accordance with the invention includes the step of arranging a plurality of cell components, each having an opening extending therethrough, relative to an elongated terminal member so that the terminal member is loosely disposed within and along the openings in the cell components and the cell components loosely surround the terminal member in a stacked array. The cell components of this step include a plurality of metal electrodes each having a plurality of resilient, deflective portions facing in the direction of the elongated terminal member. Each deflective portion further has a contact edge facing in the direction of the terminal member. The terminal member employed in this step is an expandable member and is initially in a non-expanded state in which it is spaced from the resilient, deflective portions and contact edges of the metal electrodes.

At the completion of the above step, the elongated terminal member is expanded outwardly from its initial non-expanded state to a permanently expanded state.

The amount of the outward expansion is controlled so as to cause the terminal member to make direct physical contact with the contact edges, deflect the resilient, deflective portions of the metal electrodes, and thereafter maintain direct physical contact with the contact edges of the deflective portions. As a result of this expansion step, the metal electrodes are secured to the terminal member.

BRIEF DESCRIPTION OF THE DRAWING

Various objects, features and advantages of a method in accordance with the invention for assembling a primary electrochemical cell will be apparent from a detailed discussion taken in conjunction with the accompanying drawing in which.

DETAILED DESCRIPTION OF THE INVENTION

Figure 1:
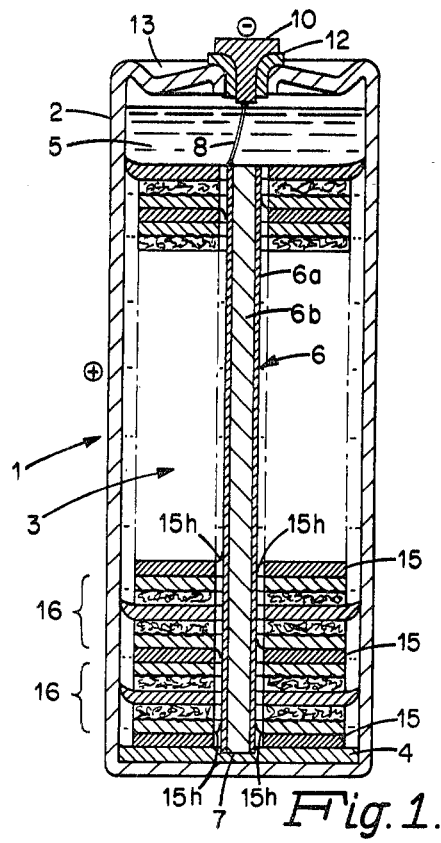
FIG. 1 is an elevated view, partly in cross section, of a primary electrochemical cell as assembled in accordance with the method of the present invention.

Referring now to FIG. 1, there is shown a primary electrochemical cell 1 assembled by a method in accordance with the present invention. The electrochemical cell 1 as shown in FIG. 1 generally includes an elongated, cylindrical metal case or housing 2, for example, of stainless steel, within which a battery stack 3 is disposed and insulated from the metal housing 2 by means of a suitable insulator 4 at a bottom end of the housing. The housing 2 of the cell 1 further includes an electrolytic solution 5 in contact with the battery stack 3. This solution may include a reducible soluble cathode such as thionly chloride and an electrolyte solute such as lithium tetrachloroaluminate dissolved in the thionly chloride.

The battery stack 3 as employed within the cell 1 comprises a large number of thin, generally circular, annular-shaped components which are superimposed directly on each other in a vertical stacked array relative to the housing 2 and relative to a terminal assembly 6 which extends completely and centrally through the battery stack 3 and is encircled by the aforesaid components. The terminal assembly 6, which will be described in greater detail hereinafter, comprises a slotted elongated metal tube 6a, shown more clearly in FIG. 6, and a solid metal rod 6b of the same length as, and disposed within, the tube 6a. The tube 6a and the rod 6b, which may be of nickel, are restrained at the bottom ends thereof within a detent 7 in the insulator 4. The tube 6a is connected at its top end by a thin metal strip 8 to a metal terminal 10 of the cell 1. The metal strip 8, which may be of nickel, is typically connected to the tube 6a of the assembly 6 and to the terminal 10 by spot welds and is connected to the terminal 10 by way of a standard insulative glass or ceramic-to-metal seal 12 provided within an hermetically sealed cap 13 of the cell 1. As will be more readily apparent hereinafter, the terminal assembly 6, the metal strip 8 and the terminal 10 collectively represent one of the electrical terminals for the cell 1.

The various stacked components of the battery stack 3 as mentioned hereinabove generally include a plurality of anode structures 15 and a plurality of carbon current collector electrode/separator assemblies 16 arranged in the array in alternation with the anode structures 15. Each of the anode structures 15 has a particular form as shown in FIGS. 2 and 3, and each of the carbon current collector electrode/separator assemblies 16 has a particular form as shown in FIGS. 4 and 5.

Figure 2:
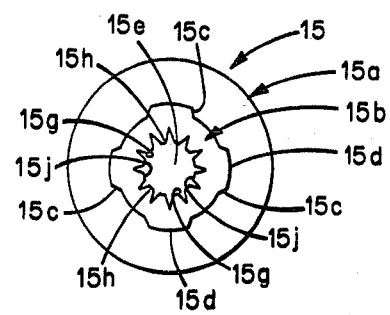
FIGS. 2 and 3 are greatly enlarged top and cross-sectional views, respectively, of an anode structure utilized by the electrochemical cell of FIG. 1.
Figure 3:
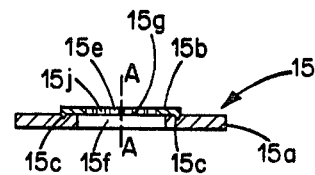

As indicated in FIGS. 2 and 3, each of the anode structures 15 comprises a thin, flat, generally circular, annular-shaped disc 15a, and a small, generally circular contact member 15b secured to the disc 15a. A suitable material for the disc 15a for use within the cell 1 is an oxidizable alkali metal, such as lithium, and a suitable thickness is 0.005–0.006 inch. The contact member 15b, which may be of nickel of a thickness of 0.003–0.005 inch, is secured to the lithium anode disc 15a by means of several small downwardly-directed spikes or barbs 15c which are arranged in pairs and depend from opposite ends of a plurality of tab portions 15d. The tab portions 15d extend outwardly and are spaced around the periphery of the contact member 15b at 90° intervals, and the barbs 15c themselves are spaced around the periphery of the contact member 15b at 45° intervals. The barbs 15c, which typically extend orthogonally from the contact member 15b, are pressed into the lithium disc 15a, as indicated in FIG. 3, and "bite" into the soft lithium metal for permanent physical and electrical contact therewith. The contact member 15b further has a circular major opening 15e in a flat central portion thereof aligned with a similar, larger opening 15f (FIG. 3) in the disc 15a, and a plurality of small openings 15g in the form of triangular-shaped notches equally spaced about the periphery of the central opening 15e, for example, at 30° intervals. The notches 15g define a plurality of resilient, deflective portions 15h, or "teeth", intermediate to the notches 15g and lying within a flat, common plane orthogonal to a central axis A—A (FIG. 3) of the contact member 15b. Each of the portions 15h further has a sharp contact edge 15j of slight curvature and facing the center of the contact member 15b. The portions 15h of the contact member 15b establish direct physical contact with the terminal assembly 6 and, due to the sharp edges 15j of the portions 15h, bite into the tube 6a of the assembly 6 in numerous places, as indicated in FIG. 1, so as to secure the anode structure 15 in position. The manner in which this contact is established will be described in greater detail hereinafter in connection with FIG. 6. As indicated in FIG. 1, the diameter of each anode structure 15 is selected to be smaller than the internal diameter of the housing 2 of the cell 1 so as to establish a space between the anode structure 15 and the interior wall of the housing 2 by which the stack 3 can be exposed to the electrolytic solution 5. A suitable diameter for the anode structure 15 is 0.850 inch, corresponding to a C-size cell. A typical internal diameter for the housing 2 is 0.960 inch. A suitable diameter for the contact member 15b (largest diametric dimension) is 0.250 inch and a suitable diameter for the opening 15e is 0.128 inch. The anode structure 15 and the contact member 15b as described hereinabove are also disclosed, and are claimed, in the aforementioned U.S. Pat. No. 4,283,470.

Figure 4:
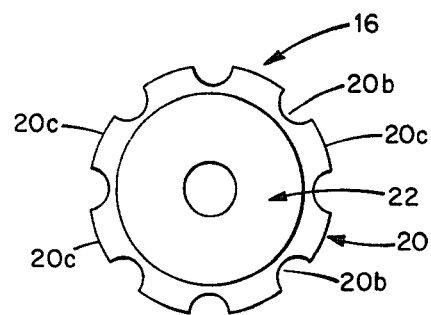
FIGS. 4 and 5 are greatly enlarged top and cross-sectional views, respectively, of a carbon current collector electrode/separator assembly utilized by the electrochemical cell of FIG. 1.
Figure 5:
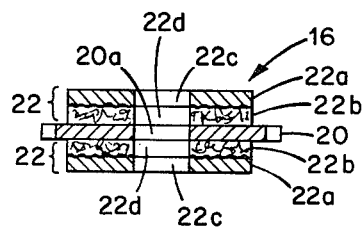

Each of the aforementioned carbon current collector electrode separator assemblies 16 as shown in FIGS. 4 and 5 generally includes a thin, circular, notched, metal current collector substrate 20, and a pair of integrated carbon/insulator structures 22 on opposite sides of the current collector substrate 20. The integrated carbon insulator structures 22 as shown in FIGS. 1 and 5, although forming part of the electrode/separator assembly within the cell 1, both physically and actively, are not secured to the current collector substrate 20 but rather are only in direct physical contact with the substrate 20 when assembled into the cell 1. The current collector substrate 20 as employed by the cell 1 and shown in FIGS. 4 and 5 takes the form of a generally thin, circular, flat disc of a metal such as nickel having a circular central opening 20a (FIG. 5) and a plurality of openings 20b in the form of curved notches spaced around its periphery at regular intervals and defining small arcuate peripheral portions 20c intermediate to the notches. The opening 20a in the substrate 20 is of a diameter greater than the diameter of the terminal assembly 6 so as to establish a spacing, and to be electrically isolated from, the terminal assembly 6 when the substrate 20 and the associated carbon/insulator structures 22 are assembled together into the cell 1. The notches 20b serve to establish multiple passageways by which the electrolytic solution 5 is able quickly and readily to permeate porous components of the battery stack 3. In addition, and as will be more fully explained hereinafter, the notches 20b enable the peripheral portions 20c to be deflected upwardly during assembly of the cell 1 whereby sharp edges of the portions 20c are able to bite into the interior wall of the housing 2 and, as indicated in FIG. 1, make direct physical and electrical contact with the wall of the housing 2 in numerous places. The diameter of the substrate 20 prior to insertion into the housing 2 is slightly greater than the internal diameter of the housing 2 so as to permit upward deflection of the arcuate portions 20c when the substrate 20 is inserted into the housing 2.

Each of the carbon/insulator structures 22 used with the abovedescribed current collector substrate 20 comprises, as shown in FIG. 5, an arrangement of a thin porous insulator sheet or disc 22a physically and permanently integrated with a porous carbon layer or disc 22b. The porous insulator disc 22a is of an electrically-nonconducting material such as fiberglass and serves as a separator for electrically isolating the associated porous carbon disc 22b from an immediately adjacent one of the lithium anode structures 15. The porous carbon disc or layer 22b comprises an aggregation of porous globules or conglomerates containing carbon black and a binder such as "Teflon" and having a network of electrolyte-conducting channels formed throughout its entire mass for permitting the electrolytic solution 5 to permeate the layer 22b and the associated insulator disc 22a. For purposes of assembly within the cell 1, the porous insulator disc 22a and the porous carbon layer 22b have respective circular central openings 22c and 22d of the same size as, and aligned with, the opening 20a in the current collector substrate 20a for providing a space between these elements and the terminal assembly 6 when assembled within the cell 1.

The carbon/insulator structures 22 as described hereinabove are described in detail in the aforementioned co-pending application Ser. No. 159,266 to which reference may be made for specific details. The current collector substrate 20 as described hereinabove is described in detail in the aforementioned co-pending application Ser. No. 159,271 to which reference may be made for specific details. Suitable thicknesses for the porous insulator disc 22a and the porous carbon layer 22b are 0.005 and 0.007 inch, respectively. A suitable thickness for the current collector substrate 20 is 0.003 inch.

Figure 6:
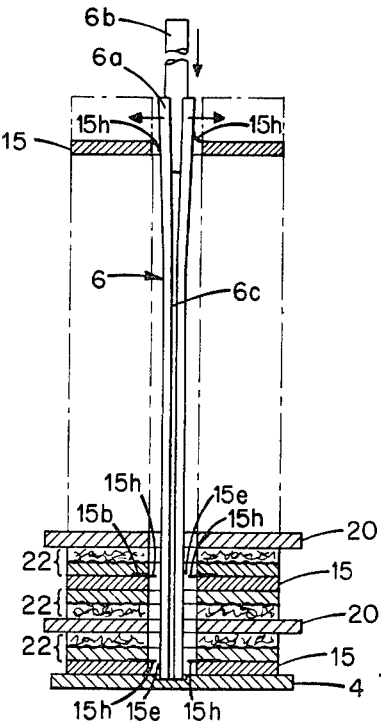
FIG. 6 illustrates a step employed in the assembly of the electrochemical cell of FIG. 1.

The electrochemical cell 1 as described hereinabove is assembled in the following manner. First, the anode structures 15, the current collector substrates 20 and the carbon/insulator structures 22 are dropped down in proper sequence over the tube 6a of the terminal assembly 6 so as to generally loosely encircle the tube 6a. As indicated in FIG. 6, the openings 15e in the contact members 15b of the anode structures 15 are slightly larger than the diameter of the tube 6a so as to establish a small space therebetween but not as large as the spaces established between the other components of the battery stack 3 and the tube 6a, which other components have openings of considerably larger size than the openings 15e in the contact members 15b of the anode structures 15. As also indicated in FIG. 6, the above assembly operation is performed externally of the housing 2 of the cell 1.

Once the abovedescribed cell components have been assembled around the tube 6a, the anode structures 15 in the stack are caused to be secured to the tube 6a. To accomplish this operation, the tube 6a as employed at this point is selected to be a permanently expandable member which makes physical contact with the anode structures 15, specifically, the contact members 15b thereof, when in its expanded state but not when in its non-expanded state. To expand the tube 6a, the aforementioned elongated metal rod 6b is inserted into and pushed longitudinally down through the tube 6a, as indicated in FIG. 6. The rod 6b initially has a diameter greater than the inside diameter of the tube 6a, for example, a diameter of 0.062 inch as compared with an initial inside diameter of 0.052 inch for the tube 6a. A suitable initial outside diameter for the tube 6a is 0.126 inch (representing a wall thickness for the tube 6a of 0.032 inch). When the rod 6b is pushed down the tube 6a, the tube 6a, which has a generally C-shaped cross section by virtue of the provision of a slot 6c therein, is caused to expand outwardly in a permanent fashion. The rod 6b is left permanently within the tube 6a, as indicated in FIG. 1, so as to insure that the tube 6a remains in its expanded state. As the tube 6a expands outwardly, the forces of the outward expansion are distributed more or less evenly to the resilient, deflective portions 15h of each of the multiple contact members 15b, in succession, as the rod 6b is progressively advanced past successive ones of the anode structures 15 along the length of the tube 6a. The forces against the contact edges 15j of the portions 15h, which lie in a flat, common plane as previously mentioned, cause the portions 15h variously to be deflected upwardly and downwardly in a random fashion relative to the tube 6a. The edges 15j of the portions 15h following the deflection of the portions 15h (at the termination of the expansion operation) bite into the tube 6a in numerous places as indicated in FIG. 1, thereby locking the anode structures in position. The outward expansion of the tube 6a does not affect the other cell components since, as previously mentioned, the central openings in these components are considerably larger than the openings 15e in the contact members 15b of the anode structures 15. A suitable slot width (non-expanded) for the tube 6a as described hereinabove is 0.010 inch.

The above expansion operation by which the anode structures 15 are secured to the tube 6a results in a stacked array of components which is very compact and devoid of unwanted spaces or gaps between the components constituting the stack due to flared or upturned edges. The possibility of breakage of the components is therefore substantially reduced. For physically large cells, the rod 6b as described hereinabove may be replaced by a hollow tube (without a slot) and, in addition, both of the tubes may be perforated for facilitating the exposure of the battery stack to the electrolytic solution when assembled into the housing 2 of the cell.

Once the anode structures 15 have been secured to the terminal assembly 6 as described hereinabove, various standard resistance measurement tests may be made on the stack of components to detect any unwanted short circuit conditions, for example, short circuit conditions between the carbon current collector electrode/separator assemblies 16 and the terminal assembly 6 and/or the anode structures 15. Assuming that no such short circuit conditions exist, the assembly of the battery stack components and the terminal assembly 6 can then be inserted into the housing 2 of the cell 1 and electrolytic solution added to the cell. The insertion operation is performed by simply pushing the entire assembly of cell components and the terminal assembly 6 longitudinally into and along the housing 2. As the assembly is pushed into the housing 2, the arcuate portions 20c of the substrates 20 are caused to turn, or be deflected, upwardly slightly by virtue of physical contact with the interior wall of the housing 2. At the same time, the arcuate portions 20c are caused to move slightly toward each other as the individual substrates 20 conform to the internal diameter and configuration of the housing 2. When the multiple substrates 20 have all been inserted into the housing 2, the upturned, deflected arcuate portions 20c, by virtue of their sharp edges, bite into the interior wall of the housing 2 in numerous places, as indicated in FIG. 1, so as to secure the substrates 20 in position and make physical and electrical contact with the housing 2.

When the abovedescribed battery stack assembly has been positioned within the cell 1 and exposed to electrolytic solution as discussed hereinabove, the electrolytic solution (e.g., cathodelectrolyte solution) is readily able to diffuse into the stack and permeate the porous components thereof. The flow of the electrolytic solution to the components of the stack is facilitated by the aforedescribed numerous notches 20b formed in the current collector substrates 20 and adjacent to the interior wall of the housing 2 and by the spaces established between the components of the stack and the interior wall of the housing 2 and the terminal assembly 6. As previously mentioned, the flow of electrolytic solution to the battery stack 3 can be further increased, especially in the case of a physically large cell, by the use of hollow, elongated perforated tubes in lieu of the non-perforated tube 6a and the solid rod 6b, in which case the electrolytic solution is able to further penetrate the battery stack 3 by way of the perforations in the tubes. Irrespective of the particular manner in which the electrolytic solution reaches the battery stack, the electrolytic solution diffuses into the multiple carbon discs 22b by way of the network of electrolyte-conducting channels formed therein and also diffuses into the multiple porous discs 22a. The physical and electrical connection of the multiple anode structures 15 to the terminal assembly 6 establishes that assembly and the metal strip 8 and the terminal 10 connected therewith as the negative terminal of the cell 1. The physical and electrical connection of the multiple substrates 20 to the interior wall of the housing 2 establishes the housing 2 as the positive terminal of the cell 1.

While there has been described what is considered to be a preferred method of the invention, it will be apparent to those skilled in the art that various changes and modifications may be made therein without departing from the invention as called for in the appended claims.

What is claimed is:

1. A method for assembling cell components for an electrochemical cell, comprising the steps of:

arranging a plurality of cell components, each having an opening extending therethrough, relative to an elongated terminal member so that the terminal member is loosely disposed within and along the openings in the cell components and the cell components loosely surround the terminal member in a stacked array, said cell components including a plurality of metal electrodes each having a plurality of individual resilient, deflective portions lying in a flat, common plane and facing in the direction of the elongated terminal member and each deflective portion having a contact edge facing in the direction of the terminal member, said terminal member being expandable and being initially in a non-expanded state in which it is spaced from the resilient, deflective portions and contact edges of the metal electrodes; and expanding the elongated terminal member radially outwardly from its initial non-expanded state to a permanently expanded state by an amount to cause the terminal member to make direct physical contact with the contact edges, deflect the resilient, deflective portions of the metal electrodes upwardly and downwardly in a random pattern relative to the initial planes of the deflective portions of the metal electrodes, and thereafter maintain direct physical contact with the contact edges of the deflective portions whereby said metal electrodes are secured to the terminal member.

2. A method in accordance with claim 1 further comprising the step of:

inserting the assembly produced in the expansion step into an elongated metal housing of an electrochemical cell.

3. A method in accordance with claim 1 wherein:

the terminal member is a hollow elongated metal tube having a central opening along its length; and the step of expanding the terminal member comprises the step of:

inserting and progressively advancing an expanding member into and along the central opening of the elongated terminal member tube to progressively and permanently expand the tube radially outwardly to cause the expanded tube to make direct physical contact with the contact edges of the metal electrodes, deflect the resilient, deflective portions of the metal electrodes, and thereafter maintain direct physical contact with the contact edges of the deflective portions.

4. A method in accordance with claim 3 wherein:

the expanding member is an elongated member and is caused, following the expansion of the elongated terminal tube, to permanently remain within the terminal tube thereby to permanently maintain the terminal tube in its expanded state.

5. A method in accordance with claim 3 wherein:
the terminal member tube is generally cylindrical and has a slot along its length defining a generally C-shaped cross section for the tube; and
the expanding member employed to expand the terminal member tube is a generally cylindrical member of the same length as the terminal member tube and having a size greater than the internal diameter of the tube by an amount to cause the terminal member tube to expand radially outwardly and make direct physical contact with the contact edges, deflect the resilient, deflective portions of the metal electrodes, and thereafter maintain direct physical contact with the contact edges of the deflective portions.

6. A method in accordance with claim 5 wherein: the expanding member is a solid rod.

7. A method in accordance with claim 6 further comprising the steps of:
inserting the assembly produced in the expansion step into an elongated metal housing of an electrochemical cell; and
exposing the assembly to an electrolytic solution.

8. A method in accordance with claim 1 wherein:
the plurality of cell components further includes, in addition to the metal electrodes, other cell components arranged in the stacked array in alternation with the metal electrodes, said other components having openings therethrough of a size establishing a spacing between said other components and the terminal member when the terminal member has been expanded outwardly to its permanently expanded state.

9. A method in accordance with claim 8 wherein: the metal electrodes are anode structures.

10. A method in accordance with claim 9 wherein each of the anode structures comprises:
a metal disc having an opening therein through which the terminal member extends thereby to be encircled by the metal disc; and
contact means secured to the metal disc and having an opening therein aligned with the opening in the metal disc and through which the terminal member extends, said contact means including a plurality of individual resilient, deflective portions at the periphery of the opening therein facing in the direction of the terminal member and each having a contact edge facing in the direction of the terminal member.

11. A method in accordance with claim 10 wherein: the metal disc of each anode structure is of an oxidizable alkali metal.

12. A method in accordance with claim 11 wherein: the metal disc of each anode structure is of lithium.

13. A method in accordance with claim 12 further comprising the steps of:
inserting the assembly produced in the expansion step into an elongated metal housing of an electrochemical cell; and
exposing the assembly to an electrolytic solution.

14. A method in accordance with claim 13 wherein:
the electrolytic solution is a cathodelectrolyte solution including a reducible soluble cathode and an electrolyte solute dissolved in the reducible soluble cathode.

15. A method for assembling cell components for a primary electrochemical cell, comprising the steps of:
arranging a plurality of cell components, each having an opening extending therethrough, relative to an elongated terminal member so that the terminal member is loosely disposed within and along the openings in the cell components and the cell components loosely surround the terminal member in a stacked array, said cell components including a plurality of anode structures each comprising a flat metal disc having an opening therein through which the terminal member extends and a contact member secured to the metal disc and having a major opening therein aligned with the opening in the metal disc and through which the terminal member extends, said contact member further having a plurality of additional openings at intervals about the perimeter of the major opening defining a plurality of individual resilient, deflective portions intermediate to the plurality of additional openings, said deflective portions lying within a flat, common plane, each of said deflective portions facing in the direction of the elongated terminal member and each having a contact edge facing in the direction of the terminal member, said terminal member being expandable and being initially in a non-expanded state in which it is spaced from the resilient deflective portions and contact edges of the contact members of the anode structures; and
expanding the elongated terminal member radially outwardly from its initial non-expanded state to a permanently expanded state by an amount to cause the terminal member to make direct physical contact with the contact edges of the contact members of the plurality of anode structures, in succession, deflect the resilient, deflective portions of each contact member upwardly and downwardly in a random pattern relative to the initial planes of the deflective portions of the contact members, and thereafter maintain direct physical contact with the contact edges of the resilient, deflective portions of each of the contact members whereby said anode structures are secured to the terminal member.

16. A method in accordance with claim 15 wherein:
the plurality of cell components further includes, in addition to the anode structures, other cell components arranged in the stacked array in alternation with the anode structures, said other components having openings therethrough of a size establishing a spacing between said other components and the terminal member when the terminal member has been expanded outwardly to its permanently expanded state.

17. A method in accordance with claim 15 wherein:
the terminal member is a hollow elongated metal tube having a central opening along its length; and
the steps of expanding the terminal member comprises the step of:
inserting and progressively advancing an expanding member into and along the central opening of the elongated terminal tube to progressively and permanently expand the tube outwardly to cause the tube to make direct physical contact with the contact edges of the contact members of the plural anode structures, in succession, deflect the deflective portions of each contact member, aand thereafter maintain direct physical contact with the contact edges of the resilient, deflective portions of each of the contact members.

18. A method in accordance with claim 17 wherein:

the expanding member is an elongated member and is caused, following the expansion of the elongated terminal tube, to permanently remain within the terminal tube thereby to permanently maintain the terminal tube in its expanded state.

19. A method in accordance with claim 18 wherein:

the terminal member tube is generally cylindrical and has a slot along its length defining a generally C-shaped cross section for the tube; and the expanding member employed to expand the terminal member tube is a generally cylindrical member of the same length as the terminal member tube and having a size greater than the internal diameter of the terminal member tube by an amount to cause the terminal member tube to expand radially outwardly and make direct physical contact with the contact edges of the contact members, cause deflection of the resilient, deflective portions of the contact members, and thereafter maintain direct physical contact with the contact edges of the deflective portions of the contact members.

20. A method in accordance with claim 19 further comprising the steps of:

inserting the assembly produced in the expansion step into an elongated metal housing of an electrochemical cell; and exposing the assembly to an electrolytic solution.

21. A method in accordance with claim 20 wherein the metal disc of each anode structure is of an oxidizable alkali metal; and the electrolytic solution is a cathodelectrolyte solution including a reducible soluble cathode and an electrolyte solute dissolved in the reducible soluble cathode.

22. A method in accordance with claim 21 wherein:

the reducible soluble cathode of the cathodelectrolyte solution is thionyl chloride; and the electrolyte solute of the cathodelectrolyte solution is lithium tetrachloroaluminate.

23. A method in accordance with claim 22 wherein the expanding member is a solid metal rod.

* * * * *